United States Patent Office 3,006,905
Patented Oct. 31, 1961

3,006,905
PREPARATION OF COPOLYMERS
Edward M. Geiser, Downers Grove, Ill., assignor to Universal Oil Products Company, Des Plaines, Ill., a corporation of Delaware
No Drawing. Filed Feb. 16, 1959, Ser. No. 793,285
17 Claims. (Cl. 260—94.2)

This invention relates to an improved process for the preparation of copolymers and particularly to a process for the copolymerization of a diolefin with an alkylene diamine. More particularly the invention is concerned with a process for the copolymerization of a diolefin with a tetra substituted alkylene diamine.

An important factor in the polymerization of olefins or the copolymerization of diolefins with diolefins of like or dissimilar nature or, as is the case in the present process, an alkylene diamine, is the control of temperature during the polymerization or copolymerization reaction. The rigid control of temperature during the formation of the polymer or copolymer is considered a critical factor in obtaining the desired product inasmuch as this factor is believed to determine the manner in which the monomer or monomers condense to form a polymer or copolymer. The fundamentally different reaction mechanisms involved in the formation of an insoluble solid copolymerization or polymerization product as distinguished from a liquid product or a semi-solid product is based on the fact that the different copolymerization or polymerization products which are recovered are based on the difference in temperatures at which the reaction proceeds. Therefore, the temperature of the reaction mixture, particularly the point of polymer formation, is a factor of special importance in controlling the direction of the polymerization. It has now been discovered that control of this vital factor is effected, in the process of the present invention, by an internal refrigerant which absorbs a large quantity of heat which is liberated by the highly exothermic reaction at the point of polymer formation.

An arrangement for externally refrigerating the reaction mixture accompanied by rapid and thorough mixing of the monomers comprising the charge stock at the point of introducing the polymerization catalysts may be employed, although said method is not the generally preferred method of conducting the reaction. However, an objection to this type of cooling is that there is a much greater difficulty of maintaining the desired low temperature at the point of polymerization within the reaction mixture. This problem is usually associated with the difficulty of maintaining sufficient and thorough mixing to effectively disperse the catalyst and the reactants throughout the entire mass of the reaction mixture and to obtain rapid and efficient heat transfer from the external refrigerant to the centers of the polymerization whereby the undesirable type of polymerization with the resultant formation of liquid polymers as well as conjunct polymerization may be prevented. However, in the process of the present invention the internal refrigerant which is utilized is preferably a solvent and a diluent for the reaction mixture and therefore will also act in the capacity as a dispersing agent, thereby further aiding in the control of the reaction temperature by controlling the rate of reaction and, hence the rate of liberation of the exothermic heat of reaction. Prior art methods teach that the internal refrigerant which may be used to control the rate of reaction will usually comprise a lower molecular weight paraffin such as ethane, propane, butane, etc., the reaction usually taking place at a temperature of from about −100° to about −40° C. Therefore, the prior art methods are usually more costly to operate inasmuch as additional apparatus is required to maintain this relatively low temperature during the necessary reaction time.

It is therefore an object of this invention to provide a method for the controlled reaction of copolymerizing a diolefin with an alkylene diamine whereby said reaction may take place at a relatively higher temperature than the temperatures hereinbefore used.

A further object of this invention is to provide a method for controlling the reaction temperature and copolymerization of a diolefin with an alkylene diamine whereby the desired type of polymerization of monomers is effected with a corresponding decrease in the possibility of undesired types of copolymerization accompanied by the resultant formation of undesired copolymers.

One embodiment of this invention resides in a process which comprises copolymerizing a diolefin with an alkylene diamine in an N,N-dialkylamide at a temperature in the range of from about 0° to about −40° C., in the presence of a polymerization catalyst, and recovering the resultant copolymer.

A further embodiment of this invention is found in a process which comprises copolymerizing a diolefin with N,N,N',N' - tetra - kis - (2 - hydroxypropyl)ethylene diamine in N,N-dimethylformamide at a temperature in the range of from about 0° to about −40° C. in the presence of a polymerization catalyst, and recovering the resultant copolymer.

A still further embodiment of this invention is found in a process which comprises copolymerizing a diolefin with an alkylene diamine in the presence of a polymerization catalyst at a temperature in the range of from about 0° to about −40° C., the improvement in said process comprising the step of dissolving said diolefin in an N,N-dialkylamide prior to contact with said alkylene diamine and said catalyst.

A specific embodiment of the invention is found in a process which comprises copolymerizing butadiene with N,N,N',N' - tetra - kis - (2 - hydroxypropyl)ethylene diamine in N,N-dimethylformamide at a temperature in the range of from about 0° to about −40° C. in the presence of a polymerization catalyst comprising a boron trifluoride-ethyl ether complex, and recovering the resultant copolymer.

Yet another specific embodiment of the invention is found in a process which comprises copolymerizing butadiene with N,N,N',N' - tetra - kis - (2-hydroxypropyl)-ethylene diamine in the presence of a polymerization catalyst comprising a boron trifluoride-ethyl ether complex at a temperature in the range of from about 0° to about −40° C., and recovering the resultant copolymer, the improvement in said process comprising dissolving said butadiene in N,N-dimethylformamide prior to contact with said N,N,N',N'-tetra-kis-(2-hydroxypropyl)ethylene diamine and said boron trifluoride-ethyl ether complex.

Other objects and embodiments referring to alternative diolefins, alkylene diamines and N,N-dialkylamides will be found in the following further detailed description of the invention.

As hereinbefore stated the present invention is concerned with an improved process for the copolymerization of a diolefin such as butadiene with an alkylene diamine and particularly di- and tri-substituted alkylene diamines to prepare resinous compounds which are useful as adhesives or, if so desired, may be used in the preparation of surface coatings. These surface coatings will dry or will be set by the addition of heat and thus form hard surfaces which will protect the coated object beneath. These surface coatings will be resistant to acids, bases, etc., or other compounds which tend to damage the surface of the object which is coated. It is therefore now proposed that the temperature at which the copolymerization of a diolefin with an alkylene diamine may be easily controlled by the use of a solvent comprising an N,N-dialkylamide, said solvent acting as both an internal refrigerant and as a diluent for the reaction mixture. It has now been discovered that the reaction may be effected at a relatively high temperature for this particular type of reaction, said temperatures being in the range of from about 0° to about —40° C. This relatively high temperature for the reaction will result in a less expensive process inasmuch as no external refrigeration means will be required with a correspondingly higher cost in the preparation of the desired compound. For example, when no internal refrigerant is used, a temperature ranging from about —40° to about —100° C. is required in order to obtain the desired resinous copolymer, whereas the addition of an N,N-dialkylamide will allow the reaction to proceed at a temperature in the range hereinabove set forth.

Examples of N,N-dialkyamides which may be used in the process of this invention includes N,N-dimethylformamide, N,N-diethylformamide, N,N-dipropylformamide, N,N-diisopropylformamide, N,N-dibutylformamide, N,N-diisobutylformamide, N,N - dimethylacetamide, N,N - diethylacetamide, N,N-dipropylacetamide, N,N-diisopropylacetamide, N,N - dibutylacetamide, N,N - diisobutylacetamide, N,N-dimethylpropionamide, N,N - diethylpropionamide, N,N-dipropylpropionamide, N,N-diisopropylpropionamide, N,N - dibutylpropionamide, N,N - diisobutylpropionamide, etc. It is to be understood that the aforementioned N,N-dialkylamides are only representatives of the class of compounds which may be used and that the present invention is not necessarily limited thereto.

The alkylene diamines which may be copolymerized with the diolefins have the generic formula:

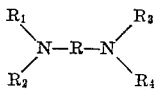

in which R is an alkylene group and $R_1$, $R_2$, $R_3$ and $R_4$ may consist of hydrogen, the same or different alkyl or substituted alkyl groups, such as N,N'-(dimethyl)ethylene diamine, N,N,N',N'-tetra-kis-(methyl)ethylene diamine, N,N' - (diethyl)ethylene diamine, N,N,N',N' - tetra - kis-(ethyl)ethylene diamine, N,N' - (dipropyl)ethylene diamine, N,N,N',N'-tetra-kis-(propyl)ethylene diamine, N,-N'-(2-hydroxypropyl)ethylene diamine, N,N,N',N'-tetra-kis-(2-hydroxypropyl)ethylene diamine, N,N'-(dimethyl)propylene diamine, N,N,N',N' - tetra - kis - (methyl)propylene diamine, N,N'-(diethyl)propylene diamine, N,N,-N',N' - tetra - kis - (ethyl)propylene diamine, N,N'-(dipropyl)propylene diamine, N,N,N',N' - tetra-kis-(propyl) propylene diamine, N,N'-(2-hydroxypropyl)propylene diamine, N,N,N',N'-tetra-kis-(2 - hydroxypropyl)propylene diamine, N,N'-(dimethyl)butylene diamine, N,N,N',N'-tetra-kis-(methyl)butylene diamine, N,N'-(diethyl)butylene diamine, N,N,N',N' - tetra - kis - (ethyl)butylene diamine, N,N' - (dipropyl)butylene diamine, N,N,N',N'-tetra-kis-(propyl)butylene diamine, N,N' - (2 - hydroxypropyl)butylene diamine, N,N,N',N' - tetra - kis-(2-hydroxypropyl)butylene diamine, etc.

Examples of diolefins which may be copolymerized with the aforementioned alkylene diamines include aliphatic diolefins such as 1,3-butadiene, hereinafter referred to as butadiene, 1,4-butadiene, 1,3-pentadiene, 1,4-pentadiene, 1,3-hexadiene, 2-methyl-1,3-pentadiene, 3-methyl-1,3-pentadiene, 4-methyl-1,3-pentadiene, 1,4-hexadiene, 1,3-heptadiene, 2-methyl-1,3-hexadiene, 3-methyl-1,3-hexadiene, 3-ethyl-1,3-hexadiene, the isomeric octadienes, nonadienes, decadienes, etc It is also contemplated within the scope of this invention that cyclic diolefins such as cyclopentadiene, 1,3-cyclohexadiene, etc., may also be used, although not necessarily with equivalent results. It is to be understood that the aforementioned alkylene diamines and diolefins are only representatives of the classes of compounds which may be used and that the present invention is not necessarily limited thereto.

The copolymerization of the diolefins with the alkylene diamine is effected in the presence of a polymerization catalyst such as boron trifluoride. Another catalyst which may be used in this process comprises substantially anhydrous hydrogen fluoride containing less than about 10% by weight thereof of water. The use of substantially anhydrous hydrogen fluoride as a catalyst in the present copolymerization reaction provides certain advantages in the recovery of the desired polymer product therein preventing the undesirable deterioration of said product during the recovery operation. Thus, hydrogen fluoride may be recovered for reuse from the catalyst-polymer complex without deleterious effects upon the product by an inexpensive and simple method hereinafter described in detail. If Friedel-Crafts metal halide catalysts such as aluminum chloride, for example, are used in the reaction, they must be separated from the reaction products by washing with an active solvent such as alcohol or water. In the case of water, the aqueous phase of the hydrolyzed reaction mixture contains chemically hydrolyzed or hydrated aluminum chloride which cannot be readily treated to recover the anhydrous catalyst for recycling purposes. In the event that alcohol is used, the catalyst is similarly solvated.

The catalyst is introduced gradually into the diolefin, the alkylene diamine and the solvent, preferably in small quantities as the reaction proceeds. If so desired the hydrogen fluoride may be added to the reaction mixture as a liquid or in gaseous form, while the boron trifluoride may be introduced in gaseous form. When the catalysts are introduced as a gas they are bubbled into the mixture as a suspension or mixture with an inert diluent gas such as nitrogen or gaseous hydrocarbons. The reaction mixture at the point of inlet of the catalyst is thoroughly agitated to obtain uniform distribution of the catalyst throughout the mixture of the reactants contacted, the total quantity of hydrogen fluoride or boron trifluoride introduced being from about 5% to about 25% of the weight of the diolefin and alkylene diamine present. Below about 5% by weight of the reactants the quantity of hydrogen fluoride or boron trifluoride is generally insufficient to convert, in adequate yield, the monomers charged to the process to polymers thereof. Above about 25% by weight of the monomers the additional quantity of catalysts effects no useful purposes in completing or extending the copolymerization reaction.

Following completion of the desired degree of copolymerization after the addition of from about 5% to about 25% by weight of the reactants of hydrogen fluoride to the reaction mixture, the hydrocarbon must be separated from the catalyst. The catalyst may be removed from the mixture by the addition of water, aqueous hydrogen fluoride, or aqueous solutions of sodium hydroxide, potassium hydroxide, ammonia, etc., after which the aqueous phase is separated from the copolymer. While such a procedure is often convenient and produces a satisfactory hydrocarbon product, the catalyst is not recovered in condition for reuse, except in the case of aqueous hydrogen fluoride from which the anhydrous acid may be distilled in part. Other methods of catalyst removal which circumvent this difficulty will be subsequently described in greater detail. Certain oxygen-containing compounds such as alcohols, esters, ethers, phenols, etc., combine with the hydrogen fluoride to form complexes and free the polymer product. In a similar manner, certain inorganic salts such as sodium fluoride, potassium fluoride, and others combine with hydrogen fluoride to form double salts; anhydrous ammonia and the amines, and alkanol amines, which form amine hydrofluoride salts by reaction with the hydrogen fluoride in the reaction mixture, particularly the high boiling amines such as aniline, pyridine, quinoline, decylamine and their homologs, the hydrogen fluoride salts of which may be heated to recover not only the organic amine for recycle purposes, but the hydrogen fluoride as well in an anhydrous state for recycle to the copolymerization stage of the process.

The above materials which combine with the hydrogen fluoride and release the copolymer therefrom may be designated collectively as "bases," where the term "base" as utilized herein characterizes a class of materials having the general properties of being capable of combining with an acid to form a complex therewith or a neutral salt thereof.

In order to promote the separation between the copolymer product and other components of the reaction mixture, particularly the product formed by the reaction of the base with the hydrogen fluoride catalyst, a low boiling naphtha diluent or other mixture of hydrocarbons containing a large percentage of aromatic hydrocarbons such as benzene, toluene, xylene, etc., may be added to the reaction mixture following the addition of the base, the polymer product dissolving in the naphtha solvent or other aromatic hydrocarbon solvent to form a separate phase which may be decanted from the remaining reaction mixture.

In accordance with a further alternative method of recovering the hydrogen fluoride catalyst from the copolymerization reaction mixture phase and simultaneously effecting the recovery of the copolymer product, the reaction mixture obtained upon completion of the copolymerization reaction may be heated or otherwise distilled to vaporize the hydrogen fluoride or boron trifluoride from the other components of the reaction mixture. The distillation is preferably effected rapidly, for example, by flash distillation of the mixture in a distillation apparatus at normal or sub-atmospheric pressure. Further, this distillation may be carried out more efficiently in the presence of a decomposition catalyst selected from such metals and their alloys as copper, cobalt, nickel, lead, tin, and silver. The hydrogen fluoride may also be flashed therefrom by introducing the polymerization reaction mixture into a low boiling hydrocarbon naphtha maintained at a temperature of from about 50° to about 150° C., and permitting the hydrogen fluoride to flash distill from the mixture. The copolymer product is thereafter recovered from its solution with the naphtha diluent and/or internal refrigerant, comprising in this case, an N,N-dialkylamide, by a low temperature distillation procedure which may be effected at sub-atmospheric pressures in order to lower the temperature and thereby prevent deterioration by further polymerization of the copolymer product. The mixture, prior to distillation, may be washed successively with several portions of water or dilute caustic to remove any residual hydrogen fluoride which would adversely affect the product during the distillation.

The following examples are given to illustrate the process of the present invention, which, however, are not intended to limit the generally broad scope of the present invention in strict accordance therewith.

Example I

A stainless steel reactor provided with a mechanical stirrer, a Dry Ice condenser, a thermocouple well and a hydrocarbon and catalyst inlet tube was used as the condensation apparatus in this experiment. The reactor was immersed in a Dry Ice-acetone bath and cooled to —40° C. A mixture of 10 g. of 1,3-butadiene in 50 g. of N,N-dimethylformamide was charged to the reactor and thoroughly admixed by bubbling the 1,3-butadiene through the solvent. Following this 25 g. of N,N,N',N'-tetrakis-(2-hydroxypropyl)ethylene diamine was added and 2.5 g. of a polymerization catalyst comprising a boron trifluoride-ethyl ether complex was bubbled into the mixture accompanied by vigorous stirring. The reaction mixture was stirred for an additional hour, the reactor being maintained at the desired temperature. Following this the reactor was allowed to warm to room temperature, the unreacted gases were vented, the reactor was opened and the reaction mixture was thereafter neutralized by the addition of sodium hydroxide, followed by a thorough washing with water. The desired reaction product, comprising a copolymer of 1,3-butadiene and N,N,N',N'-tetrakis - (2-hydroxypropyl)ethylene diamine, in the form of a clear light colored thermoplastic resinous product was separated and recovered. This product dried to form a hard clear film.

Example II

A reactor similar to that described in Example I above is cooled to a temperature of about —40° C. Following this the reactor is charged with 10 g. of 1,3-pentadiene in 50 g. of N,N-dimethylformamide. A mixture comprising 3 g. of hydrogen fluoride and 25 g. of N,N,N',N'-tetrakis-(ethyl)ethylene diamine are slowly added to the reaction mixture which is vigorously stirred during the addition. The reactor and contents thereof are maintained at a temperature of approximately —40° C. for an additional hour, the mixture being vigorously stirred during this period of time. At the end of the aforementioned period of time the reactor and contents thereof are allowed to warm to room temperature, the unreacted gases are vented and the reaction product is neutralized by the addition of sodium hydroxide. The reaction product, comprising a copolymer of 1,3-pentadiene and N,N,N',N'-tetra-kis-(ethyl)ethylene diamine is then thoroughly washed with water and recovered, the product being in the form of a clear light colored thermoplastic resinous product.

Example III

In this example the reactor, after being cooled to —40° C., is charged with 10 g. of 1,3-butadiene and 50 g. of N,N-diethylformamide. Following this 25 g. of N,N,N',N'-tetra-kis-(methyl)ethylene diamine and 2.5 g. of a boron trifluoride-ethyl ether complex are added. The mixture is continuously stirred during the addition and for an additional hour the reactor being maintained at a temperature of approximately —40° C. At the end of the reaction time the reactor and contents thereof are allowed to cool to room temperature, the unreacted gases are vented and the reaction mixture is subjected to neutralization with sodium hydroxide and washing as hereinbefore described in the above examples. The reaction product, comprising a copolymer of 1,3-butadiene and N,N,N',N'-tetra-kis-(methyl)ethylene diamine, in the form of a clear light colored thermoplastic resinous product is separated and recovered.

Example IV

In this example 10 g. of 1,3-pentadiene in 50 g. of N,N-dimethylacetamide is added to a reactor previously cooled to —40° C., followed by the addition of 25 g. of N,N'-(dimethyl)ethylene diamine and 2.5 g. of a hydrogen fluoride polymerization catalyst. The addition of the latter compounds is accompanied by a vigorous stirring, said stirring being continued throughout the duration of the reaction time. The reactor is maintained at a temperature of about —40° C. for a period of about 1 hour, at the end of which time the reactor and contents thereof are allowed to warm to room temperature. The reaction product is neutralized with sodium hydroxide and washed with water in a manner similar to that hereinbefore set forth. The desired reaction product, comprising a copolymer of 1,3-pentadiene and N,N'-(dimethyl)-ethylene diamine, in the form of a clear light colored thermoplastic resinous product is separated and recovered.

I claim as my invention:

1. A process which comprises copolymerizing an aliphatic diolefin of from 4 to 10 carbon atoms per molecule with N,N,N',N'-tetra-kis-(2-hydroxypropyl)ethylene diamine in an N,N-dialkylamide of from 3 to 11 carbon atoms per molecule at a temperature in the range of from about 0° to about −40° C. in the presence of a polymerization catalyst selected from the group consisting of boron trifluoride, hydrogen fluoride and boron trifluoride-ethyl ether complex, and recovering the resultant copolymer.

2. A process which comprises copolymerizing an aliphatic diolefin of from 4 to 10 carbon atoms per molecule with N,N,N',N'-tetra-kis-(ethyl)-ethylene diamine in an N,N-dialkylamide of from 3 to 11 carbon atoms per molecule at a temperature in the range of from about 0° to about −40° C. in the presence of a polymerization catalyst selected from the group consisting of boron trifluoride, hydrogen fluoride and boron trifluoride-ethyl ether complex, and recovering the resultant copolymer.

3. A process which comprises copolymerizing an aliphatic diolefin of from 4 to 10 carbon atoms per molecule with N,N,N',N'-tetra-kis-(methyl)ethylene diamine in an N,N-dialkylamide of from 3 to 11 carbon atoms per molecule at a temperature in the range of from about 0° to about −40° C. in the presence of a polymerization catalyst selected from the group consisting of boron trifluoride, hydrogen fluoride and boron trifluoride-ethyl ether complex, and recovering the resultant copolymer.

4. A process which comprises copolymerizing an aliphatic diolefin of from 4 to 10 carbon atoms per molecule with N,N'-(dimethyl)ethylene diamine in an N,N-dialkylamide of from 3 to 11 carbon atoms per molecule at a temperature in the range of from about 0° to about −40° C. in the presence of a polymerization catalyst selected from the group consisting of boron trifluoride, hydrogen fluoride and boron trifluoride-ethyl ether complex, and recovering the resultant copolymer.

5. A process which comprises copolymerizing 1,3-butadiene with N,N,N',N'-tetra-kis-(2-hydroxypropyl)-ethylene diamine in N,N-dimethylformamide at a temperature in the range of from about 0° to about −40° C. in the presence of a polymerization catalyst comprising a boron trifluoride-ethyl ether complex, and recovering the resultant copolymer.

6. A process which comprises copolymerizing 1,3-pentadiene with N,N,N',N'-tetra-kis-(ethyl)ethylene diamine in N,N-dimethylformamide at a temperature in the range of from about 0° to about −40° C. in the presence of a polymerization catalyst comprising hydrogen fluoride, and recovering the resultant copolymer.

7. A process which comprises copolymerizing 1,3-butadiene with N,N,N',N'-tetra-kis-(methyl)ethylene diamine in N,N-diethylformamide at a temperature in the range of from about 0° to about −40° C. in the presence of a polymerization catalyst comprising a boron trifluoride-ethyl ether complex, and recovering the resultant copolymer.

8. A process which comprises copolymerizing 1,3-pentadiene with N,N'-(dimethyl)ethylene diamine in N,N-dimethylacetamide at a temperature in the range of from about 0° to about −40° C. in the presence of a polymerization catalyst comprising hydrogen fluoride, and recovering the resultant copolymer.

9. In a process which comprises copolymerizing 1,3-pentadiene with N,N,N'N'-tetra-kis-(ethyl)ethylene diamine in the presence of a polymerization catalyst comprising hydrogen fluoride at a temperature in the range of from about 0° to about −40° C., the improvement which comprises dissolving said 1,3-pentadiene in N,N-dimethylformamide prior to contact with said alkylene diamine and said catalyst.

10. In a process which comprises copolymerizing 1,3-butadiene with N,N,N',N'-tetra-kis-(methyl)ethylene diamine in the presence of a polymerization catalyst comprising a boron trifluoride-ethyl ether complex at a temperature in the range of from about 0° to about −40° C., the improvement which comprises dissolving said 1,3-butadiene in N,N-diethylformamide prior to contact with said N,N,N',N'-tetra-kis-(methyl)ethylene diamine and said catalyst.

11. In a process which comprises copolymerizing 1,3-pentadiene with N,N'-(dimethyl)ethylene diamine in the presence of a polymerization catalyst comprising hydrogen fluoride at a temperature in the range of from about 0° to about −40° C., the improvement which comprises dissolving said 1,3-pentadiene in N,N-dimethylacetamide prior to contact with said N,N'-(dimethyl)ethylene diamine and said catalyst.

12. In a process which comprises copolymerizing 1,3-butadiene with N,N,N',N'-tetra-kis-(2-hydroxypropyl)-ethylene diamine in the presence of a polymerization catalyst comprising a boron trifluoride-ethyl ether complex at a temperature in the range of from about 0° to about −40° C., and recovering the resultant copolymer, the improvement which comprises dissolving said 1,3-butadiene in N,N-dimethylformamide prior to contact with said N,N,N',N'-tetra-kis-(2-hydroxypropyl)ethylene diamine and said boron trifluoride-ethyl ether complex.

13. A process which comprises copolymerizing a diolefin hydrocarbon of from 4 to 10 carbon atoms per molecule with an alkylene diamine of the formula:

$$\begin{array}{c}R_1 \\ \diagdown \\ R_2 \diagup \end{array} N-R-N \begin{array}{c} R_3 \\ \diagup \\ \diagdown R_4 \end{array}$$

wherein R is an alkylene group of from 2 to 4 carbon atoms and $R_1$, $R_2$, $R_3$ and $R_4$ are selected from the group consisting of hydrogen and alkyl and hydroxyalkyl groups of from 1 to 3 carbon atoms, said copolymerization being effected in an N,N-dialkylamide of from 3 to 11 carbon atoms per molecule at a temperature of from about 0° C. to about −40° C. in the presence of a polymerization catalyst selected from the group consisting of boron trifluoride, hydrogen fluoride and boron trifluoride-ethyl ether complex.

14. The process of claim 13 further characterized in that said hydrocarbon is an aliphatic diolefin.

15. The process of claim 13 further characterized in that said hydrocarbon is dissolved in said N,N-dialkylamide prior to addition of the alkylene diamine and catalyst.

16. The process of claim 13 further characterized in that said diolefin hydrocarbon is 1,3-butadiene.

17. The process of claim 13 further characterized in that said diolefin hydrocarbon is 1,3-pentadiene.

References Cited in the file of this patent
UNITED STATES PATENTS

| 2,638,464 | Reynolds et al. | May 12, 1953 |
| 2,684,954 | Miller | July 27, 1954 |